United States Patent
Williamson

[15] 3,670,838
[45] June 20, 1972

[54] INFLATABLE FLUID PAD WITH SHUT-OFF VALVE

[72] Inventor: William A. Williamson, Niles, Mich.
[73] Assignee: Clark Equipment Company
[22] Filed: June 18, 1970
[21] Appl. No.: 47,409

[52] U.S. Cl. .......................................................... 180/124
[51] Int. Cl. ........................................................... B60v 1/16
[58] Field of Search .......................................... 180/124, 128

[56] References Cited

UNITED STATES PATENTS

| | | | |
|---|---|---|---|
| 3,253,667 | 5/1966 | Mackie | 180/124 |
| 3,260,322 | 7/1966 | Mackie | 180/124 |
| 3,313,367 | 4/1967 | Swedburg | 180/124 X |
| 3,363,718 | 1/1968 | Hammett | 180/128 |
| 3,576,231 | 4/1971 | Jung | 180/124 |

Primary Examiner—A. Harry Levy
Attorney—Kenneth C. Witt, John C. Wiessler, Robert H. Johnson and Reginald J. Falkowski

[57] ABSTRACT

An inflatable fluid pad including an inflatable diaphragm which forms a portion of a toroidal chamber, an inlet for supplying pressurized fluid to the chamber and at least one opening in the diaphragm for permitting pressurized fluid to flow out of the chamber. Cooperating with the opening is means for preventing fluid flow out through the opening when the diaphragm is deflated and permitting fluid flow out through the opening when the diaphragm is inflated.

6 Claims, 7 Drawing Figures

FIG. 1
FIG. 2
FIG. 3
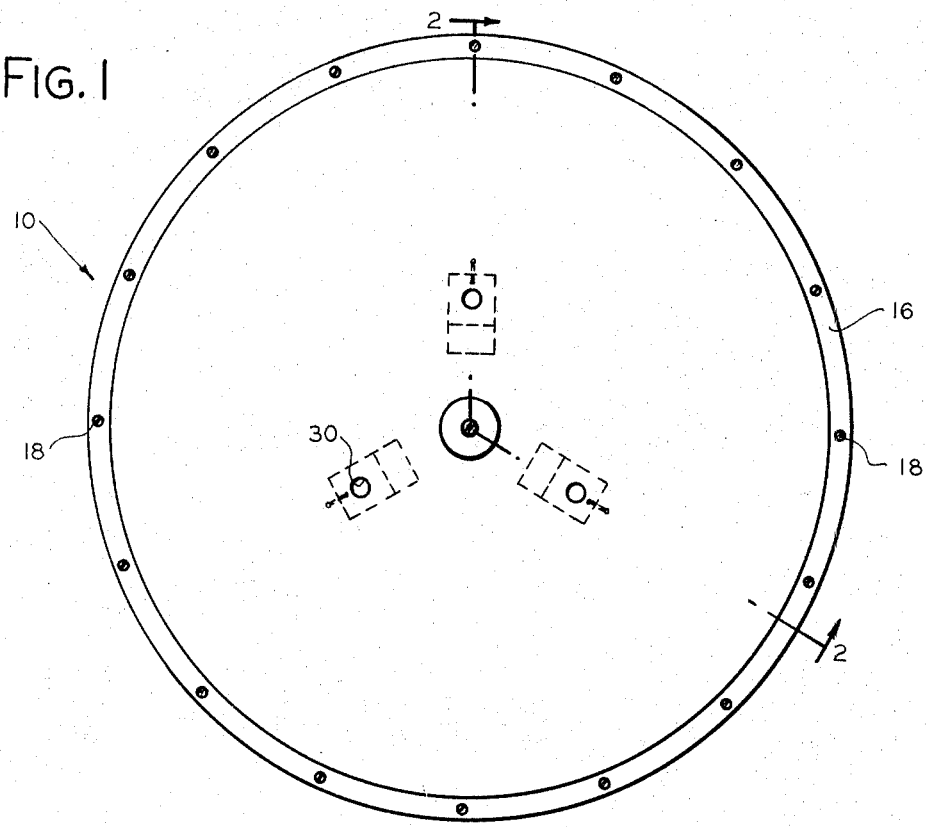
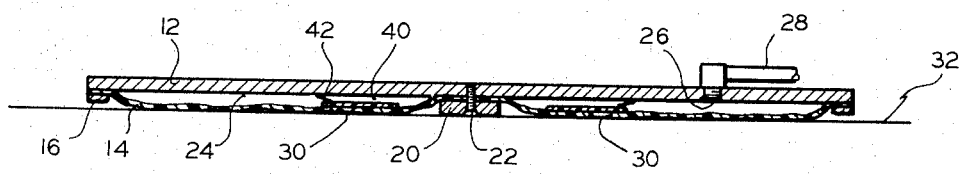
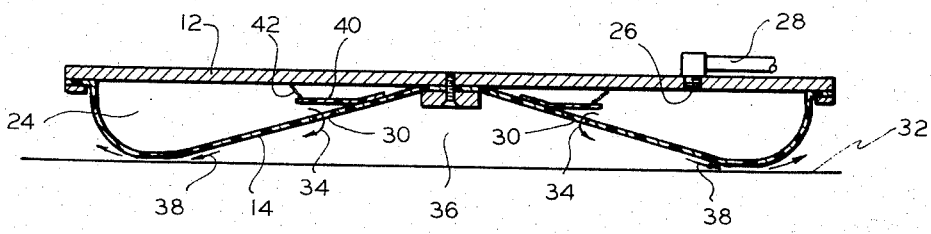
INVENTOR
WILLIAM A. WILLIAMSON
BY Robert H. Johnson
ATTORNEY

*INVENTOR*
WILLIAM A. WILLIAMSON
BY
ATTORNEY

INFLATABLE FLUID PAD WITH SHUT-OFF VALVE

BACKGROUND OF THE INVENTION

The field of art to which this invention relates includes fluid film devices, and more specifically such devices which have inflatable diaphragms.

Such a device having an inflatable diaphragm does not inflate reliably because it is dependent upon a fluid back pressure to inflate. This back pressure is prevented from developing when the device is initially deflated and the diaphragm is sufficiently wrinkled so as to provide a substantially unrestricted passage for fluid flow from the opening in the diaphragm out between the device and the surface upon which it is resting.

A principal object of my invention is to provide an inflatable fluid pad which inflates reliably from a deflated condition.

SUMMARY OF THE INVENTION

In carrying out my invention in a preferred embodiment, I provide a base to which an inflatable diaphragm is connected at its periphery and at substantially its midpoint. The diaphragm defines with the base a toroidal chamber to which pressurized fluid can be supplied. Located in the diaphragm is at least one opening out through which the pressurized fluid supplied to the chamber can flow. Cooperating with the opening is a flap valve for preventing fluid flow out of the opening when the diaphragm is deflated. The valve is connected to the base so that as the diaphragm is inflated, the valve opens.

In another embodiment of my invention, I provide an inverted resilient dish-shaped member located in the toroidal chamber and disposed to cooperate with the diaphragm so that fluid flow out through the opening is prevented when the diaphragm is deflated.

In still another embodiment of my invention, I provide a resilient ring located in the toroidal chamber and disposed to cooperate with the diaphragm so that fluid flow out through the opening is prevented when the diaphragm is deflated.

The above and other objects, features and advantages of my invention will be better understood by persons skilled in the art when the detailed description is taken in conjunction with the drawing.

BRIEF DESCRIPTION OF THE DRAWING

FIG. 1 is a bottom view of my improved fluid pad;

FIG. 2 is a sectional view taken along line 2—2 of FIG. 1 and shows the pad in a deflated condition;

FIG. 3 is similar to FIG. 2, except the pad is shown in an inflated condition;

DESCRIPTION OF THE PREFERRED EMBODIMENT

Figure 4:
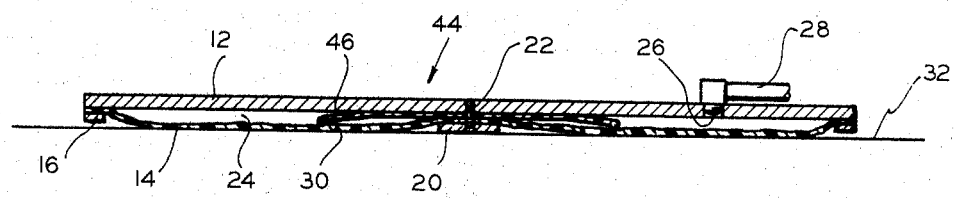
FIG. 4 is similar to FIG. 2 and shows a modification of my invention.

Referring to FIGS. 1, 2 and 3, the reference numeral 10 denotes generally an inflatable fluid or air pad which is generally circular in plan view, although other regular shapes can be utilized. Pad 10 includes a rigid base 12 to which an inflatable diaphragm 14 is connected at the periphery thereof by means of a ring 16 and a plurality of fasteners 18. Diaphragm 14 is flexible and preferably a smooth sheet of plastic, such as polyurethane. Diaphragm 14 also is connected at substantially the midpoint thereof to base 12 by means of a disc 20 and a fastener 22 which threadably engages base 12 and clamps diaphragm 14 between disc 20 and base 12. Disc 20 also serves to support pad 10 when it is deflated in order to prevent damage to diaphragm 14.

Diaphragm 14 defines with base 12 a toroidal chamber 24 which is best seen in FIG. 3. Pressurized air is supplied to toroidal chamber 24 through an opening 26 in base 12 to which a suitable conduit 28 is connected and which in turn communicates with a source of pressurized air, not shown. While opening 26 is shown to be disposed in base 12, it also could be disposed adjacent the outer periphery of diaphragm 14, although this is not as desirable a location. Located in diaphragm 14 near the midpoint thereof is a plurality of openings 30 which in this case are shown to be three in number and disposed equidistantly from one another.

When pad 10 is disposed on a supporting surface 32 and inflated with pressurized air supplied through opening 26 so that diaphragm 14 assumes substantially the form shown in FIG. 3, air is flowing out through openings 30, as indicated by arrows 34, into a plenum chamber 36 defined by the underside of diaphragm 14 and supporting surface 32 and hence out from under pad 10 as indicated by arrows 38 in a thin film approximately 0.015 of an inch thick. This film acts as a lubricant and permits pad 10 to be moved easily omnidirectionally over supporting surface 32.

In order for pad 10 to inflate, it is necessary to have a back pressure to cause diaphragm 14 to inflate. In order to provide this back pressure, diaphragm 14 has to be disposed in close proximity to supporting surface 32 so that there is a restriction to the fluid flow, indicated by arrows 38, out from under pad 10 due to the close proximity of diaphragm 14 to supporting surface 32. The requisite back pressure may not be present when pad 10 initially is in a deflated condition and diaphragm 14 is substantially wrinkled as frequently is the case. In order to overcome this problem, I have improved the conventional inflatable pad by providing each opening 30 with a flap valve 40 which preferably is connected to diaphragm 14 by bonding. Valve 40 also is connected to base 12 by a tensile member 42 which preferably is a nylon cord. Valve 40 and tensile member 42 are arranged so that when pad 10 is in the deflated condition shown in FIG. 2, valve 40 prevents pressurized fluid from flowing out through opening 30, but permits fluid flow out through opening 30 when pad 10 is inflated as shown in FIG. 3. This insures that diaphragm 14 inflates regardless of the initial back pressure generated by the restriction to fluid flow out from under pad 10 between diaphragm 14 and supporting surface 32.

In order to enable persons skilled in the art to better understand my invention, I will now explain the operation of it. It will be assumed that initially pad 10 is in the deflated condition shown in FIG. 2 and that pressurized air is being supplied to toroidal chamber 24 through opening 26. Valves 40 will initially prevent pressurized air from escaping from toroidal chamber 24 so that diaphragm 14 will begin to inflate. As diaphragm 14 inflates, base 12 will be elevated to the position shown in FIG. 3. When this occurs, tensile members 42 will pull on valves 40, causing them to open and thus permit pressurized air to flow out through openings 30 and to plenum chamber 36. This air can then escape in a thin film out from under pad 10 between diaphragm 14 and supporting surface 32. It will be noted, however, that once diaphragm 14 is inflated, there is sufficient restriction to flow out from under pad 10 to provide suitable back pressure to keep diaphragm 14 inflated.

Figure 5:
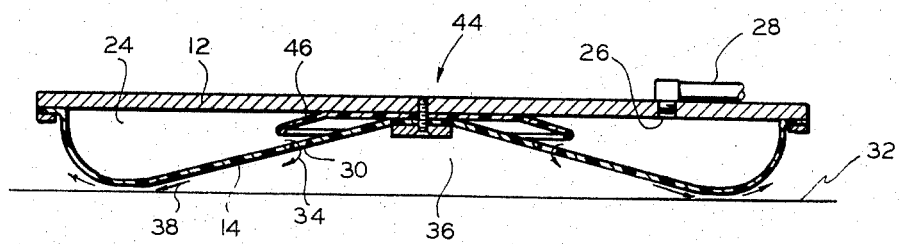
FIG. 5 is similar to FIG. 4 and shows the pad in an inflated condition.

FIGS. 4 and 5 show a modified pad 44. In describing this modification, I have applied like reference numerals to like parts, and to the extent of similarity between this modification and the preferred embodiment, reference should be had to the preceding description in this regard.

Disposed between base 12 and diaphragm 14 is a resilient inverted dish-shaped member 46 which is clamped between base 12 and diaphragm 14 by means of disc 20 and threaded fastener 22. Member 46 overlays openings 30 so that when pad 44 is in the deflated condition shown in FIG. 4, member 46 presses against diaphragm 14 and supporting surface 32 so as to block fluid flow out of toroidal chamber 24. As diaphragm 14 inflates due to toroidal chamber 24 being filled with pressurized fluid, diaphragm 14 moves away from contact with member 46 so as to permit fluid flow from toroidal chamber 24 out through openings 30. At this point, it will be clear that member 46 performs the same function as flap valves 40, and so further description of operation is not felt to be necessary.

Figure 6:
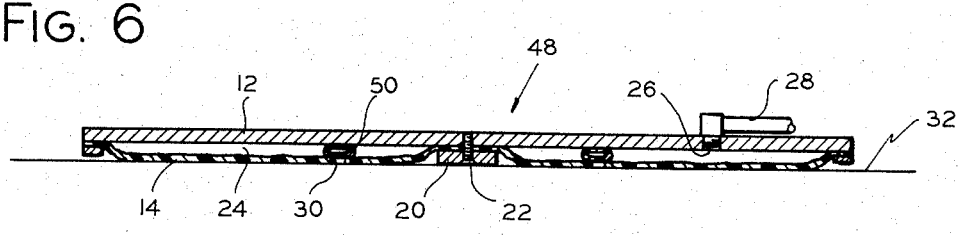
FIG. 6 is similar to FIG. 2 and shows another modification of my invention.
Figure 7:
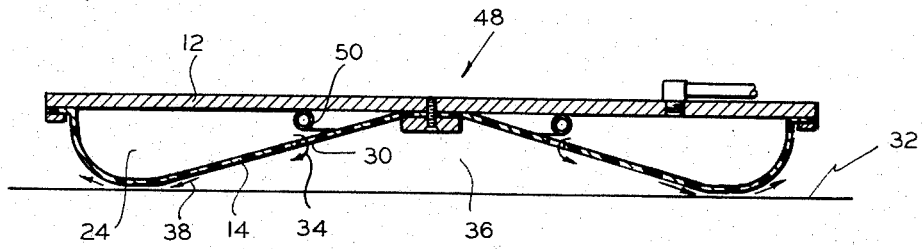
FIG. 7 is similar to FIG. 6 and shows the pad in an inflated condition.

In FIGS. 6 and 7, another modified pad 48 is shown. Again, like reference numerals are applied to like parts and to the extent that pad 48 is similar to pad 10, reference should be had to the preceding description of pad 10. Flap valves 40 are replaced with a resilient ring 50 which is connected to base 12 by any suitable means, such as bonding. Ring 50 is generally circular and preferably an inflated hollow tube. Ring 50 is disposed so that when pad 48 is in the deflated condition shown in FIG. 6, ring 50 is compressed and clamps diaphragm 14 between it and supporting surface 32. Also, ring 40 covers openings 30 so that in the position shown in FIG. 6, pressurized fluid being supplied to toroidal chamber 24 is prevented from flowing out through openings 30. As pressurized fluid is supplied to toroidal chamber 24, causing diaphragm 14 to inflate, base 12 is elevated so that ring 50 moves away from openings 30, thereby permitting fluid flow out through openings 30 as indicated by arrows 34 into plenum chamber 36 and hence out from under pad 48 in a thin film as indicated by arrows 38.

The foregoing detailed description of my invention is intended to be illustrative only, and while three embodiments of it have been described, it will be understood that it is subject to various other modifications and changes. Consequently, the scope of my invention should be determined from the following claims.

I claim:

1. An inflatable fluid pad comprising a base, an inflatable diaphragm connected at the periphery thereof and at substantially the midpoint thereof to said base, said diaphragm defining with said base a toroidal chamber, means for supplying pressurized fluid to said chamber, at least one opening in said diaphragm, and valve means internal of said chamber, connected to said base and cooperating with said opening for preventing the flow of pressurized fluid from said chamber out through said opening when said diaphragm is deflated and permitting the flow of pressurized fluid from said chamber out through said opening when said diaphragm is inflated.

2. An inflatable fluid pad as set forth in claim 1 and including means connected to said base for supporting said base and diaphragm when said diaphragm is deflated.

3. An inflatable fluid pad as set forth in claim 1 wherein said flow preventing means includes a flap valve disposed in an overlaying position relative to said opening and connected to said diaphragm and means connecting said valve to said base so that as said diaphragm is inflated said valve is moved away from said opening.

4. An inflatable fluid pad as set forth in claim 1 wherein said flow preventing means is an inverted resilient dish-shaped member disposed in said toroidal chamber in an overlaying position relative to said opening and connected to said base so that said dish-shaped member is resiliently biased into sealing relation with said diaphragm when said diaphragm is deflated and said diaphragm moves away from sealing relation with said dish-shaped member when said diaphragm is inflated.

5. An inflatable fluid pad as set forth in claim 1 wherein said flow preventing means is a resilient ring disposed in said toroidal chamber and connected to said base so that communication between said supplying means and said opening is blocked when said diaphragm is deflated.

6. An inflatable fluid pad as set forth in claim 5 wherein said ring is an inflated tube.

* * * * *